United States Patent [19]
Kudo et al.

[11] Patent Number: 4,886,342
[45] Date of Patent: Dec. 12, 1989

[54] PHOTOGRAPHIC LENS DEVICE

[75] Inventors: Yoshinobu Kudo, Osaka; Kiyohiro Yoshida, Aichi, both of Japan

[73] Assignee: Minolta Camera Kabushi Kaisha, Osaka, Japan

[21] Appl. No.: 355,800

[22] Filed: May 22, 1989

Related U.S. Application Data

[63] Continuation of Ser. No. 126,788, Nov. 30, 1987, abandoned.

[30] Foreign Application Priority Data

Dec. 3, 1986 [JP] Japan .................. 61-288326

[51] Int. Cl.$^4$ .......................... G02B 7/02; G02B 9/16
[52] U.S. Cl. ................................. 350/252; 350/417; 350/475
[58] Field of Search ............... 350/252, 417, 474, 475

[56] References Cited

U.S. PATENT DOCUMENTS

| 2,373,815 | 4/1945 | Riccio | 350/252 |
| 3,402,003 | 9/1968 | McFarland | |
| 3,784,287 | 1/1974 | Grey | 350/252 |
| 4,258,982 | 3/1981 | Skinner et al. | 350/252 |

FOREIGN PATENT DOCUMENTS

| 1099204 | 2/1961 | Fed. Rep. of Germany ...... 350/417 |
| 55-167207 | 12/1980 | Japan . |
| 59-58410 | 4/1984 | Japan . |
| 60-230604 | 11/1985 | Japan . |

Primary Examiner—Bruce Y. Arnold
Assistant Examiner—Martin Lerner
Attorney, Agent, or Firm—Price, Gess & Ubell

[57] ABSTRACT

A photographing lens device wherein the optical axes of lenses can be aligned with a high degree of accuracy with a simple structure and at least a lens made of a plastic material can be secured to a lens barrel without causing a torsion thereof. The photographing lens device comprises first, second and third lenses arranged in this order from the object side. The second and third lenses have mutually contacting flat faces formed thereon outside effective light path regions therein, and the third lens is secured to the second lens at the flat faces of them by a bonding agent. The optical axis of the second and third lenses are aligned with each other by slipping the lenses along the flat faces thereof before adhesion. The second lens further has a contacting face formed outwardly of the flat face thereof and is pressed at the contacting face thereof against a face of a lens barrel while the first lens is pressed against the second lens by a pressing member coupled to the lens barrel.

9 Claims, 1 Drawing Sheet

PHOTOGRAPHIC LENS DEVICE

This is a continuation of application Ser. No. 126,788 filed on Nov. 30, 1987 now abandoned.

BACKGROUND OF THE INVENTION

1. Field of the Invention

This invention relates to a photographing lens device in which lenses of a 3-component lens system are retained on a lens barrel.

2. Description of the Prior Art

A specific technique for a lens system of a photographing lens device in which a plurality of lenses are assembled in a mutually contacting relationship is disclosed in Japanese Utility Model Laid-Open No. 59-58410 wherein the lenses have flat portions formed at mutually contacting zones thereof and, in assembling the lenses, the flat portions are contacted with each other in order to establish alignment of the optical axes of the lenses whereafter the lenses are adhered to each other to make a unitary lens system. In the technique, the flat portions of the lenses are provided in order to establish alignment of the optical axes of the lenses with a high degree of accuracy, and a bonding agent is used in order that the aligned lenses may not come out of the aligned condition. Thus, the flat portions of the lenses and the bonding agent are used as an optical axis aligning means for the lenses.

In a 3-component lens system including first to third lenses, conventionally such a structure for retaining the lenses on a lens barrel may be employed that the lenses are pressed from an object side outer peripheral face of the first lens with an image side outer peripheral face of the third lens contacted with a lens holding face of the lens barrel. However, where the first lens is made of a glass material and the second and third lenses are made of plastic materials, such a structure as described just above has a disadvantage that the second and/or third lenses may suffer from distortion which will deteriorate the accuracy of the shape of the second and third lenses. Besides, such a lens system which includes a plurality of lenses requires accurate alignment of the optical axes of the lenses.

SUMMARY OF THE INVENTION

Accordingly, it is an object of the present invention to provide a photographing lens device wherein the optical axes of lenses can be aligned with a high degree of accuracy with a simple structure.

It is another object of the present invention provide a photographing lens device wherein a lens made of a plastic material can be secured to a lens barrel without causing a distortion thereof.

Here, it can be expected that occurrence of a distortion of the first and/or third lenses which may be caused by securing of the lenses to the lens barrel can be prevented if flat faces formed on portions of the second and third lenses outside effective light path regions through the lenses are slipped on each other in order to establish alignment of the axes of the second and third lenses and after completion of such alignment a bonding agent is placed on outer portions of the flat faces of the second and third lenses in order to adhere the second and third lenses to each other whereafter the first and second lenses are pressed against the lens barrel from an object side outer peripheral face of the first lens with an image side outer peripheral face of the second lens contacted with a lens holding face of the lens barrel. Besides, it can be additionally expected that such a lens aligning means including the flat faces of the second and third lenses and the bonding agent can also serve as a means for retaining the third lens on the lens barrel.

In order to attain the objects, according to the present invention, there is provided a photographing lens device which comprises a first lens, a second lens located on the image side of the first lens and having a flat face formed thereon outside an effective light path region therein and a contacting face formed thereon outwardly of the flat face, a third lens located on the image side of the second lens and having a flat face formed thereon outside an effective light path region therein, an adhering means for adhering the flat faces of the second and third lenses to each other, a first member for contacting with the contacting face of the second lens to hold the second lens against the first lens, and a second member coupled to the first member for pressing the first lens against the second lens.

With the photographing lens device, since the second and third lenses are adhered to each other at the mutually contacting flat faces thereof which are formed outside the effective light path regions in the respective second and third lenses, the photographing lens is advantageous in that operation for aligning the optical axes of the second and third lenses can be carried out easily. Further, since the second and third lenses are adhered to each other after the alignment of the optical axes of the second and third lenses has been reached in order to prevent the lenses from coming out of optical alignment with each other, the photographing lens device is further advantageous in that improvement in accuracy of the photographing lens device can be attained. Besides, since the first to third lenses are securely retained on the first member by the first member which contacts with the contacting face of the second lens formed outwardly of the flat face and the second member coupled to the first member for pressing the first lens against the second lens, the photographing lens device is also advantageous in that the first member which may be a lens barrel need not have a contacting face or shoulder for contacting with the third lens and accordingly can be simplified in its internal structure, and occurrence of a distortion of the second and/or third lenses where they are made of plastic materials can be prevented.

The above and other objects, features and advantages of the present invention will become apparent from the following description and the appended claims, taken in conjunction with the accompanying drawings.

DETAILED DESCRIPTION OF THE PREFERRED EMBODIMENT

Figure 1:
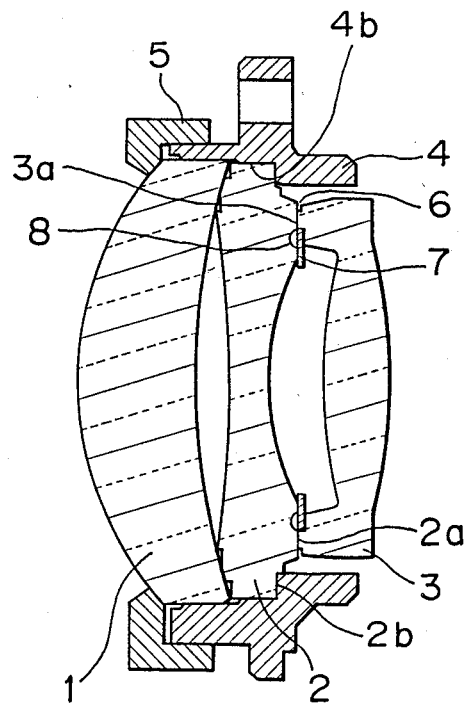
FIG. 1 is a cross sectional view of a photographing lens device showing a preferred embodiment of the present invention.
Figure 2:
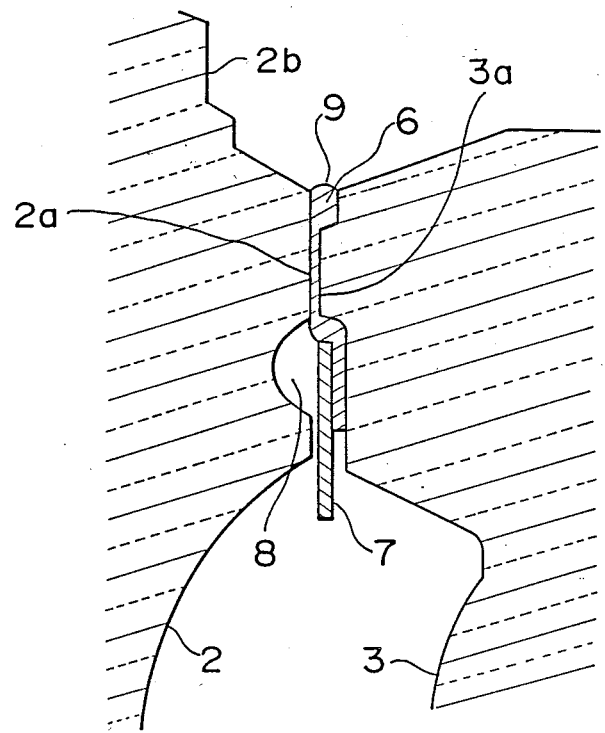
FIG. 2 is a partial enlarged cross sectional view of the photographing lens device of FIG. 1.

Referring to FIGS. 1 and 2, a photographing lens device shown includes a lens barrel 4 and a 3-component lens system retained on the lens barrel 4 and including first, second and third lenses 1, 2 and 3. The second and third lenses 2, 3 are both made of plastic materials and have mutually contacting annular flat faces 2a, 3a formed at portions thereof outside effective light path regions therein, respectively. The annular flat faces 2a, 3a of the second and third lenses 2 and 3 are formed perpendicularly to respective optical axes of the second and third lenses 2 and 3. The second and third lenses 2, 3 are thus adhered at the annular flat faces 2a, 3a thereof to each other. The second lens 2 further has a barrel contacting face 2b formed at a portion outside the annular flat face 2a thereof adjacent the third lens 3. Thus, the lenses 1 to 3 are securely retained on the lens barrel 4 by a lens holding face 4b of the lens barrel 4 contacting with the barrel contacting face 2b of the second lens 2 and a pressing member 5 for pressing the first lens 1 against the second lens 2.

With the photographing lens device, the second and third lenses 2, 3 can be aligned with a high degree of accuracy by mutually slipping the annular flat faces 2a, 3a which are formed at portions of the second and third plastic lenses 2, 3 outside the effective light path regions in the lenses 2, 3. After completion of such alignment, the annular flat faces 2a, 3a are adhered to each other in order to secure the third lens 3 to the second lens 2 and prevent the optical axes of the second and third lenses 2, 3 from coming out of alignment with each other. Then, the second lens 2 is placed so as to contact the barrel contacting face 2b thereof with the lens holding face 4b of the lens barrel 4, and then the first to third lenses 1, 2, 3 are retained in position by the pressing member 5 adjacent the first lens 1. Thus, with the photographing lens device of the present invention, the optical axes of the second and third lenses 2, 3 are prevented from coming out of alignment with each other after adhesion of the annular flat faces 2a, 3a of the second and third lenses 2, 3, and the third lens 3 is retained on the lens barrel 4 by way of the second lens 2. Accordingly, the number of man-hours for assembly can be reduced and the structure of the lens barrel 4 for retaining the lenses 1 to 3 can be simplified. Besides, the second and third lenses 2, 3 made of plastic materials can be prevented from suffering from distortion.

Now, the preferred embodiment of the present invention will be described in more detail.

Referring to FIG. 1, the first lens 1 is made of a glass material while the second and third lenses 2, 3 are made of plastic materials. The mutually contacting annular flat faces 2a, 3a are formed at portions of the second and third lenses 2, 3 outside the effective light path regions in the lenses 2, 3. Thus, the optical axes of the second and third lenses 2, 3 are aligned with each other by slipping the lenses 2, 3 along the annular flat faces 2a, 3a. After completion of such alignment of the optical axes, the second and third lenses 2, 3 are adhered at the annular flat faces 2a, 3a thereof to each other. The barrel contacting face 2b in the form of an annular flat face is formed at a portion of the second lens 2 outside the annular flat face 2a adjacent the third lens 3. The barrel contacting face 2b of the second lens 2 is contacted with the lens holding face 4b of the lens barrel 4, and the lenses 1 to 3 are pressed against and securely retained on the lens barrel 4 by the lens holding face 4b and the pressing member 5 for pressing the first lens 1 against the second lens 2. It is to be noted that the third lens 3 does not contact at any part thereof with an inner circumferential face of the lens barrel 4 and is supported on the second lens 2 in an afloat condition spaced away from the lens barrel 4. Accordingly, when and after the lens system is secured to the lens barrel 4, no stress is imposed on the third lens 3.

Referring now to a partial enlarged cross sectional view of FIG. 2, a gap or clearance 6 is formed at an outer location of the mutually contacting annular flat faces 2a, 3a of the second and third lenses 2, 3. More particularly, the gap 6 is defined by an annular recessed face formed at a portion of the third lens 3 radially outward of the annular flat face 3a and opposing to the annular contacting face 2a of the second lens 2. The gap 6 is provided in order to facilitate application of a bonding agent 9. Thus, the bonding agent 9 applied into the gap 6 will be drawn between the mutually contacting annular flat faces 2a, 3a of the second and third lenses 2, 3 due to a capillary action. Accordingly, the bonding agent 9 can be spread over the entire mutually contacting faces of the second and second lenses 2, 3. It is to be noted that while in the embodiment the gap 6 is provided by the annular recessed face of the third lens 3, it may otherwise be provided by a similarly recessed face formed on the second lens 2 or else it may be provided by such recessed faces formed on both of the second and third lenses 2, 3.

Referring to FIGS. 1 and 2, an annular light interrupting plate 7 is located inside the mutually contacting annular flat faces 2a, 3a of the second and third lenses 2, 3 and extends annularly or circumferentially around the optical axis of the lens system for interrupting ghost flare light.

The second lens 2 has an annular groove 8 formed inside the annular flat face 2a thereof and extending annularly around the optical axis of the lens system. The annular groove 8 is provided in order to prevent possible deterioration of an appearance of the lens system, that is, an appearance as viewed from the first lens 1 side, which deterioration may be caused by the bonding agent 9 flowing onto an object side face of the light interrupting plate 7. In particular, while the bonding agent 9 applied into the gap 6 between the second and third lenses 2, 3 comes around radially inwardly between the lenses 2, 3 due to a capillary action, it will then come around only into a fine spacing between the light interrupting plate 7 and the third lens 3 as particularly seen in FIG. 2 due to the presence of the annular groove 8 on the second lens 2 side which groove has a size sufficient to prevent the bonding agent 9 from flowing into the groove 8. Accordingly, the bonding agent 9 will not come around to the object side face of the light interrupting plate 7.

It is to be noted that the pressing member 5 for the first lens 1 may otherwise be a pressing member which is formed as an integral part of the lens barrel 4 made of a plastic material and is thermally caulked to an outer circumferential edge portion of the front face of the first lens 1.

Further, while in the embodiment the first lens 1 is located on the object side and the third lens 3 is located on the image side, the arrangement of the first to third lenses 1 to 3 may be reversed.

Meanwhile, any other lens than the plastic lenses may be either cemented lenses or a separate lenses.

Having now fully described the invention, it will be apparent to one of ordinary skill in the art that many changes and modifications can be made thereto without departing from the spirit and scope of the invention as set forth herein.

What is claimed is:

1. A photographing lens device, comprising:
a first lens having a polished lens surface;

a second lens, having a polished lens surface offset from and of a smaller area than the first lens polished surface, and positioned adjacent to said first lens, the second lens having a contact portion outside an effective light path which extends through the second lens polished lens surface, the contact portion positioned immediately opposite the first lens polished lens surface and directly pressed against said first lens polished lens surface for positioning said second lens relative to said first lens, the second lens further having a flat face formed thereon outside an effective light path therein and a contacting face formed thereon outwardly of said flat face;

a third lens adjacent to said second lens and having a flat face formed thereon outside an effective light path therein;

an adhering means for adhering said flat faces of said second and third lenses to each other;

a first member for contacting with said contacting face of said second lens to hold said second lens against said first lens; and a second member coupled to said first member for pressing said first lens against said second lens.

2. A photographing lens device as claimed in claim 1, wherein said third lens is spaced away from said second member.

3. A photographing lens device as claimed in claim 1, further comprising a light interrupting means located between said flat faces of said second and third lenses for interrupting harmful light to its image forming operation.

4. A photographing lens device as claimed in claim 3, wherein said light interrupting means includes a light interrupting member in the form of a flat plate located between said flat faces of said second and third lenses.

5. A photographing lens device as claimed in claim 3, wherein said second lens has a groove formed on said flat face thereof in an opposing relationship to said light interrupting means.

6. A photographing lens device as claimed in claim 1, wherein at least one of said second and third lenses has a recess formed therein for applying a bonding agent therethrough into a spacing between said flat faces of said second and third lenses.

7. A photographing lens device as claimed in claim 1, wherein said second and third lenses are made of a synthetic resin material.

8. A photographing lens device as claimed in claim 1, wherein said first to third lenses are located in the order from the object side.

9. In a photographic lens assembly having at least a pair of plastic lenses that are to be assembled with liquid adhesive in an economic manner with a light interrupting member defining an effective optical opening between the lenses, the improvement comprising:

a mounting assembly having a first contact surface and a complementary second contact surface positioned at respective peripheral portions of the pair of plastic lenses, one of the contact surfaces having an annular offset portion positioned for receiving liquid adhesives adjacent an outer peripheral portion, additionally, an object side plastic lens' contact surface has an annular groove positioned immediately in front of and adjacent an object side of the light interrupting member of a sufficient size to prevent adhesives from flowing by capillary action across the light interrupting member which could mar the appearance of the object side surface of the light interrupting member.

* * * * *